(12) United States Patent
Arrasvuori

(10) Patent No.: US 8,493,407 B2
(45) Date of Patent: Jul. 23, 2013

(54) METHOD AND APPARATUS FOR CUSTOMIZING MAP PRESENTATIONS BASED ON USER INTERESTS

(75) Inventor: Juha Henrik Arrasvuori, Tampere (FI)

(73) Assignee: Nokia Corporation, Espoo (FI)

( * ) Notice: Subject to any disclaimer, the term of this patent is extended or adjusted under 35 U.S.C. 154(b) by 396 days.

(21) Appl. No.: 12/553,462

(22) Filed: Sep. 3, 2009

(65) Prior Publication Data

US 2011/0050732 A1     Mar. 3, 2011

(51) Int. Cl.
*G09G 5/00*     (2006.01)

(52) U.S. Cl.
USPC ........... 345/619; 345/440; 345/581; 345/660; 345/661

(58) Field of Classification Search
None
See application file for complete search history.

(56) References Cited

U.S. PATENT DOCUMENTS

| 4,853,852 | A | 8/1989 | Rosen |
| 6,115,655 | A | 9/2000 | Keith et al. |
| 6,622,085 | B1* | 9/2003 | Amita et al. ............. 340/995.14 |
| 7,032,188 | B2 | 4/2006 | Salmimaa et al. |
| 7,522,996 | B2 | 4/2009 | Jung et al. |
| 7,541,945 | B2 | 6/2009 | Nakashima |
| 2002/0023000 | A1 | 2/2002 | Bollay |
| 2002/0062223 | A1* | 5/2002 | Waugh .............................. 705/1 |
| 2002/0065605 | A1 | 5/2002 | Yokota |
| 2005/0102098 | A1* | 5/2005 | Montealegre et al. ........ 701/209 |
| 2006/0069503 | A1* | 3/2006 | Suomela et al. ............... 701/211 |
| 2007/0115142 | A1* | 5/2007 | Nakashima ................ 340/995.1 |
| 2008/0086264 | A1 | 4/2008 | Fisher |
| 2009/0100363 | A1 | 4/2009 | Pegg et al. |
| 2010/0164957 | A1* | 7/2010 | Lindsay et al. ............... 345/440 |

FOREIGN PATENT DOCUMENTS

| EP | 0 926 591 A1 | 6/1999 |
| JP | 9-222852 | 8/1997 |
| JP | 11-160088 A | 6/1999 |
| JP | 2004-317222 A | 6/1999 |
| JP | 2000-35341 | 2/2000 |
| JP | 2000-46576 | 2/2000 |
| JP | 2003-121189 A | 4/2003 |
| JP | 2004-233264 A | 8/2004 |
| JP | 2004317222 A * | 11/2004 |
| JP | 2004-347634 | 12/2004 |
| JP | 2005-321259 | 11/2005 |
| JP | 2005-352170 A | 12/2005 |
| JP | 2007-213293 | 8/2007 |

(Continued)

OTHER PUBLICATIONS

International search report and written opinion for corresponding international application No. PCT/FI2010/050649 dated Dec. 17, 2010, pp. 1-14.

Enhancing the Location-Context Through Inference Over Positioning Data, Meneses et al., Proceedings of the Conference on Mobile and Ubiquitous Systems, Guimarães, Portugal, Jun. 29-30, 2006, pp. 1-10.

(Continued)

*Primary Examiner* — Kee M Tung
*Assistant Examiner* — Jwalant Amin
(74) *Attorney, Agent, or Firm* — Ditthavong, Mori & Steiner, P.C.

(57) ABSTRACT

An approach is provided for customizing map presentations. A map customizing platform determines a degree of interest of a site represented on an image of a map by tracking at least one of a frequency of visit to the site and a time period of visit at the site. The map customizing platform then changes an image size of the site relative to the image of the map based on the degree of interest.

17 Claims, 13 Drawing Sheets

FOREIGN PATENT DOCUMENTS

| | | |
|---|---|---|
| JP | 2008-134458 | 6/2008 |
| TW | 200821874 A | 5/2008 |
| WO | WO 01/38826 A1 | 5/2001 |
| WO | WO 2005/048199 A1 | 5/2005 |

OTHER PUBLICATIONS

Office Action for related Chinese Patent Application No. 201080049439.3 dated May 9, 2013, pp. 1-7.

* cited by examiner

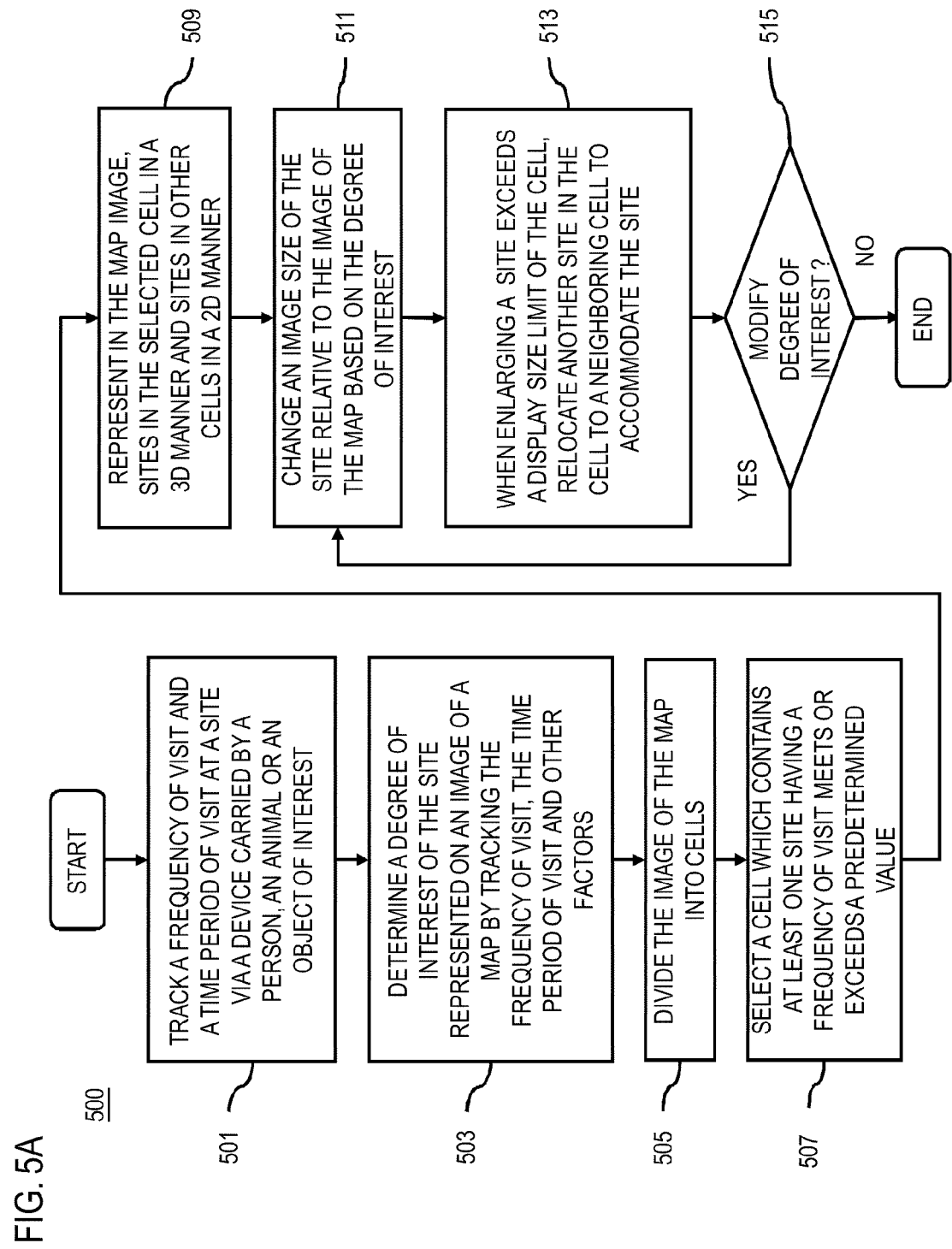

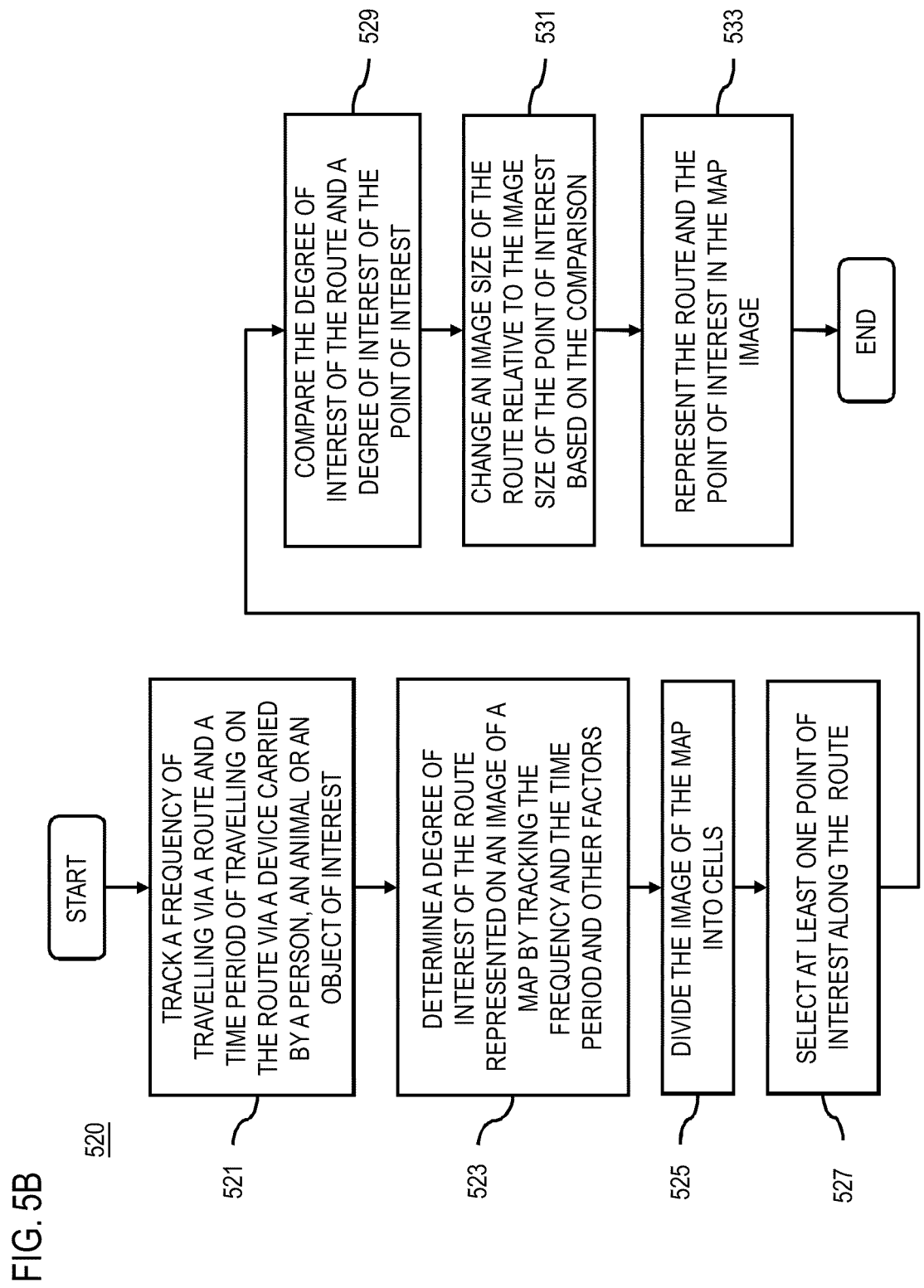

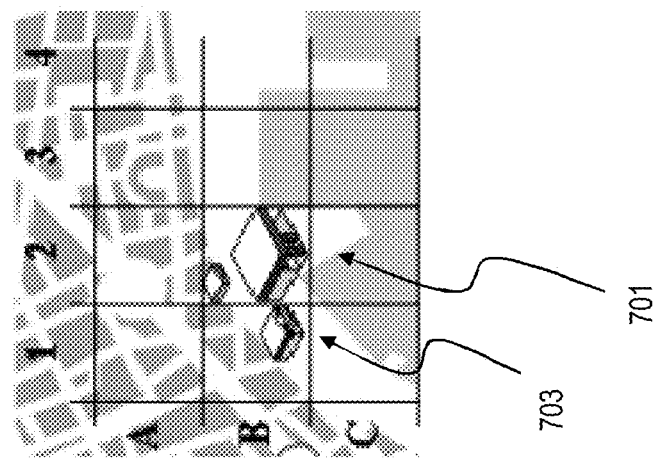

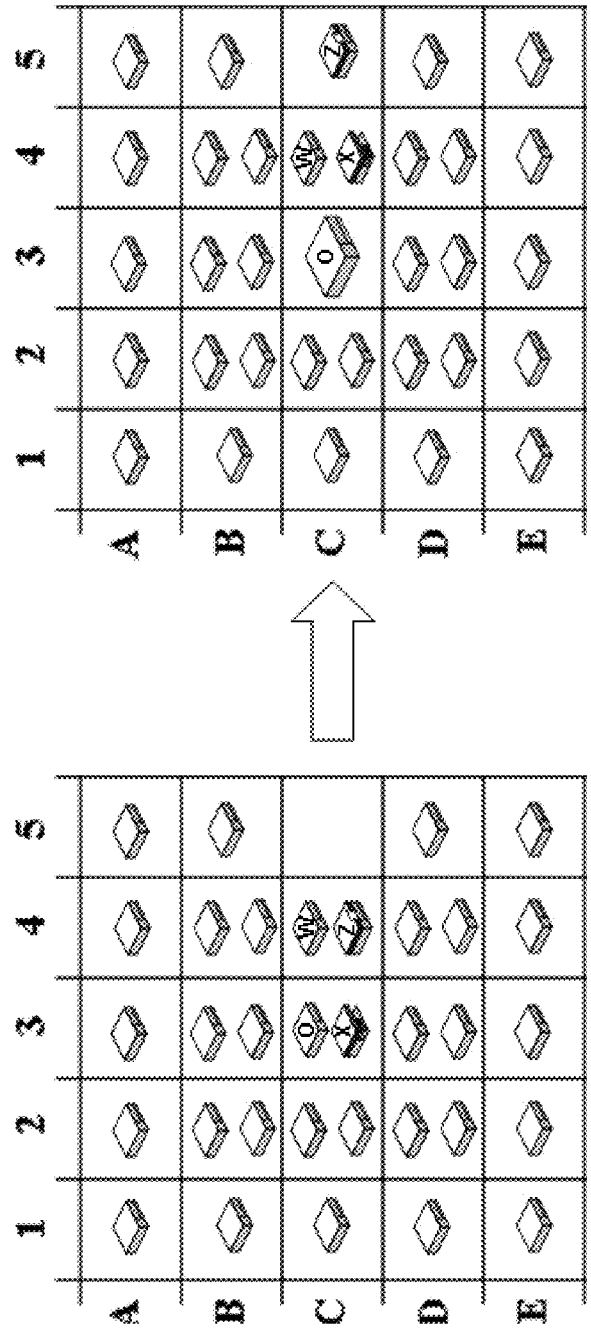

METHOD AND APPARATUS FOR CUSTOMIZING MAP PRESENTATIONS BASED ON USER INTERESTS

BACKGROUND

Service providers (e.g., wireless and cellular services) and device manufacturers are continually challenged to deliver value and convenience to consumers by, for example, providing compelling network services and advancing the underlying technologies. One area of interest has been the development of services and technologies for customizing data that is presented to users by mapping services (e.g., data that is presented on maps and cognitive maps). More specifically, electronic mapping services have access to vast stores of detailed information related a variety of points of interest (e.g., buildings, parks, tourist attractions, etc.). In fact, the number of points of interest and related information available for display often greatly exceeds the display area of the device presenting the mapping service. Accordingly, service providers and device manufacturers are challenged to develop new mechanisms for customizing map presentations (e.g., cognitive maps) to display, highlight, or otherwise indicate those points of interests and related information that are most relevant to a particular user.

SOME EXAMPLE EMBODIMENTS

Therefore, there is a need for an approach for automatically and efficiently customizing map presentations for different users.

According to one embodiment, a method comprises determining a degree of interest of a site represented on an image of a map by tracking at least one of a frequency of visit to the site and a time period of visit at the site. The method also comprises changing an image size of the site relative to the image of the map based on the degree of interest.

According to another embodiment, an apparatus comprising at least one processor, and at least one memory including computer program code, the at least one memory and the computer program code configured to, with the at least one processor, cause the apparatus to determine a degree of interest of a site represented on an image of a map by tracking at least one of a frequency of visit to the site and a time period of visit at the site. The apparatus is also caused to change an image size of the site relative to the image of the map based on the degree of interest.

According to another embodiment, a computer-readable storage medium carrying one or more sequences of one or more instructions which, when executed by one or more processors, cause an apparatus to determine a degree of interest of a site represented on an image of a map by tracking at least one of a frequency of visit to the site and a time period of visit at the site. The apparatus is also caused to change an image size of the site relative to the image of the map based on the degree of interest.

According to another embodiment, an apparatus comprises means for determining a degree of interest of a site represented on an image of a map by tracking at least one of a frequency of visit to the site and a time period of visit at the site. The apparatus also comprises means for changing an image size of the site relative to the image of the map based on the degree of interest.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5A is a flowchart of a process for customizing map presentations of a site based on user interests, according to one embodiment;

FIG. 5B is a flowchart of a process for customizing map presentations of a route based on user interests, according to one embodiment;

FIG. 7 is a diagram of map utilizing the process of FIG. 5, according to one embodiment;

FIGS. 8A and 8B are diagrams of maps utilizing the process of FIG. 5, according to one embodiment;

DESCRIPTION OF SOME EMBODIMENTS

A method and apparatus for customizing map presentations based on user interests are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
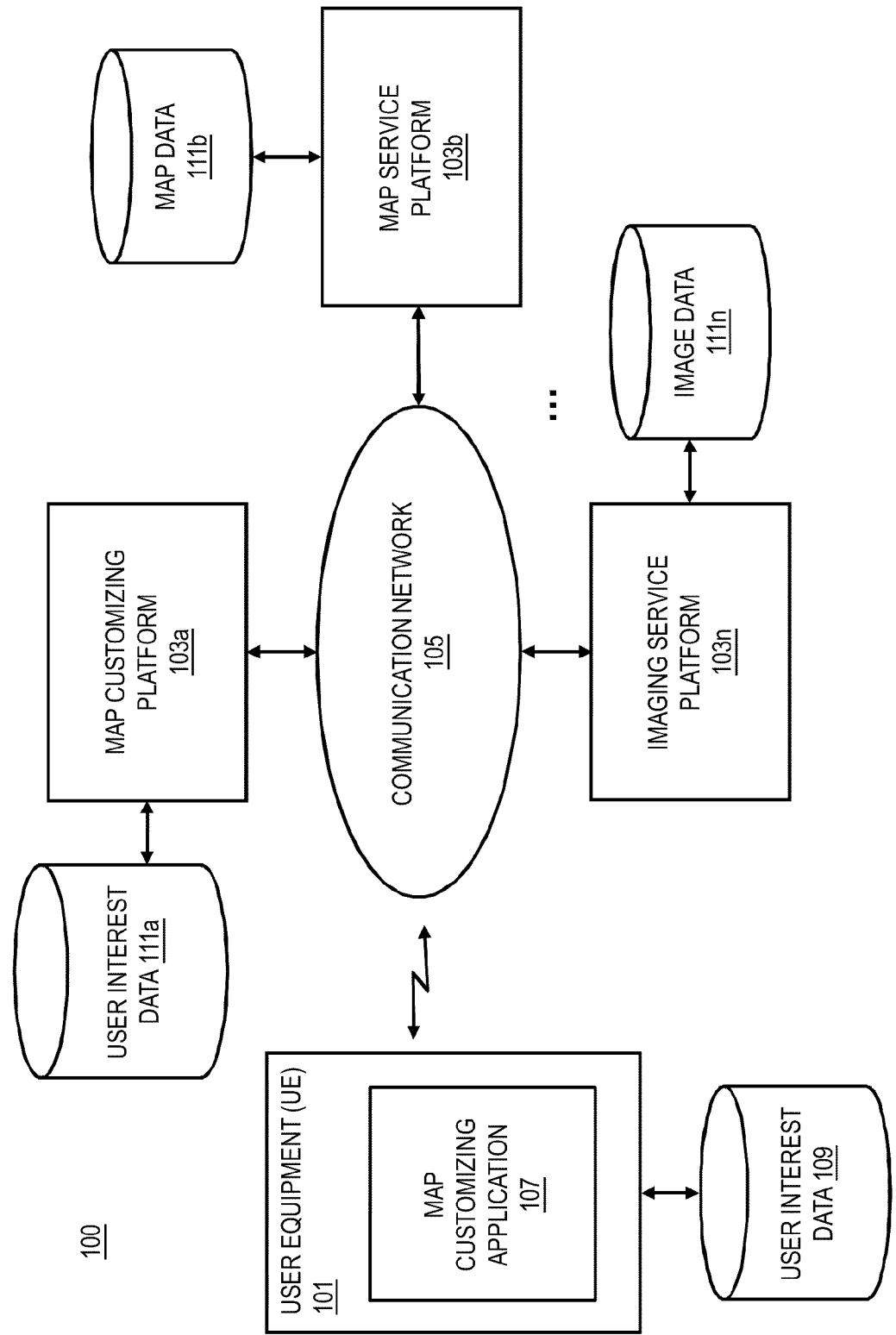
FIG. 1 is a diagram of a system capable of customizing map presentations based on user interests, according to one embodiment.

FIG. 1 is a diagram of a system capable of customizing map presentations based on user interests, according to one embodiment. Since users use maps for different purposes, there are some parts (e.g., locations, points of interest, metadata, etc.) of maps that may be of interest to one user but not to others. To filter out unwanted information on these maps, a user generally would have to manually specify search criteria and/or preferences. The list of preferences and options (e.g., categories of points of interests to display, level of map detail, etc.) can be quite long and require significant user input to specify. As a result, a user may be discouraged from or may find it overly difficult to specify the preferences for customizing the map presentation to display or emphasize information (e.g., points of interest, locations, etc.) of importance to the user.

To address this problem, a system 100 of FIG. 1 introduces to the capability to automatically collect data on user interests with respect to specific points or interests or locations on a map, determine the level of user interests with respect to each of the points of interest or locations based on the collected data, and customize a map presentation based on the determined levels of user interest. Such a point of interest, location, or site can be a physical or a virtual one. For example, a physical location can be a building, a zoo, a landmark, etc. A virtual location exists, for instance, electronically in a computer-based simulated environment, such as a computer game, Second Life® or the like. In one embodiment, instead of displaying all information in a map the same way for all users, the system 100 creates and displays cognitive maps for different users to present information that is relevant for each user.

As used herein, the term 'cognitive map' refers to a digital map drawn and reorganized on basis of how a person or a group of people perceive a physical or virtual location. The presentation of the physical location in a map need not correspond to a true scale with the respect to locations represented by the cognitive map. For example, a cognitive map of a city subway system generally represents stations at relative rather than actual distances from each other. In this case, a typical subway rider is likely to be more interested in the relative positions of the stations rather than actual distances for determining what stations are most useful for reaching a particular destination. Accordingly, cognitive maps involve electronically processing a series of transformations by which the system 100 acquires, codes, stores, recalls, and decodes general information and attributes of locations which are relevant to the users. In some embodiments, cognitive maps are used to accumulate and display spatial knowledge of one individual user, allowing the user to see images of adjusted sizes in order to enhance the user's memory of information of interest while reducing the cognitive load caused by irrelevant information. In one embodiment, the system 100 automatically creates cognitive maps containing or highlighting information of relevance to a particular user, on a user-by-user basis.

In addition, users may be interested in seeing cognitive maps generated for other users (e.g., friends, travel companions, social networking contacts, etc.) that show unique tacit knowledge of physical locations of other users. Therefore, in another embodiment of the system 100, the system 100 can aggregate the information collected about the user interests of a group of users to generate a common cognitive map for members of the group. The specific group may be defined by the user or by heuristic analysis of, for instance, the user's contacts (e.g., contacts stored on the user's mobile device, social networking contacts, etc.) For example, if a group of people plan to take a trip together, they can exchange cognitive maps of sight-seeing spots to assemble a trip itinerary considering their different preferences, perspectives and knowledge.

By way of example, it is contemplated that the system 100 can use any mechanism to collect data on user interest with respect to a point of interest or location. For example, the system 100 can automatically track the number times a user physically visits a particular point of interest or location (e.g., a building) using location based services (e.g., GPS navigation and/or tracking, cellular triangulation), location markers or beacons at specific locations (e.g., radio frequency identification (RFID) tags, Bluetooth communication, WLAN communication), biometric reading (e.g., facial recognition via security cameras). The system 100 then determines a level of interest based on the number of visits to a particular location (e.g., level of interest increases with the number of visits detected). In addition or alternatively, the system 100 can collect data on user interest based on "remote visits" to the point of interest or location. For example, the system 100 can track the number of times a person searches on the Internet for information related to a point of interest or location, or views a web page or web cam related to a point of interest or location. In another embodiment, the system 100 can process the media present on a user's device to determine the number photos or videos related to a particular location. This information is available, for instance, in media that have been geo-tagged with location information. Moreover, the system 100 can evaluate the messages (e.g., text message, e-mails, audio messages) on the user's device to determine whether specific phrases tied to points of interests or locations occur. For example, the user may have a text message stating "I love the Louvre Museum"; the system 100 can interpret this as a higher level of interest in the Louvre Museum.

Although various embodiments are described as follows with respect to a three-dimensional data for rendering imaging, it is contemplated that the approach described herein may be used with multi-dimensional data and other visual highlighting effects such as holographs, animation, miniature sets and models, animatronics, Matte paintings, augmented reality, etc.

As shown in FIG. 1, the system 100 comprises a user equipment (UE) 101 having connectivity to a map customizing platform 103a, a map service platform 103b, and an imaging service platform 103n via a communication network 105. The map customizing platform 103a customizes a map according to the world existing in a user's mind which affects the user's actions and decisions. For example, a child orients itself in a shopping mall based upon the places the child is interested or frequently visited, such as a toy store, a fast food store, etc. The map service platform 103b collects, assembles, stores, updates, and supplies map data and map formats. The imaging service platform 103n processes map data and map formats to present maps of different formats with different visual effects including, but not limited to, 2D, 3D, holographs, animation, miniature sets and models, animatronics, Matte paintings, augmented reality, etc. Each of the platforms 103a-103n and the UE 101 are connected to their own databases to access particular types of data they need to execute their respective functions. The map customizing platform 103a is connected to a user interest database 111a, the map service platform 103b is connected to a map database 111b, the imaging service platform 103n is connected to an image database 111n, and the UE 101 is connected to a user interest database 109.

The map customizing platform 103a, the map service platform 103b, and the imaging service platform 103n can be implemented via shared or partially shared hardware equipment or different hardware equipments. For the purposes of illustration, the system 100 is explained with respect to the use or three-dimensional (3D) data sets. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, the map customizing platform 103a, the map service platform 103b, and the imaging service platform 103n communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
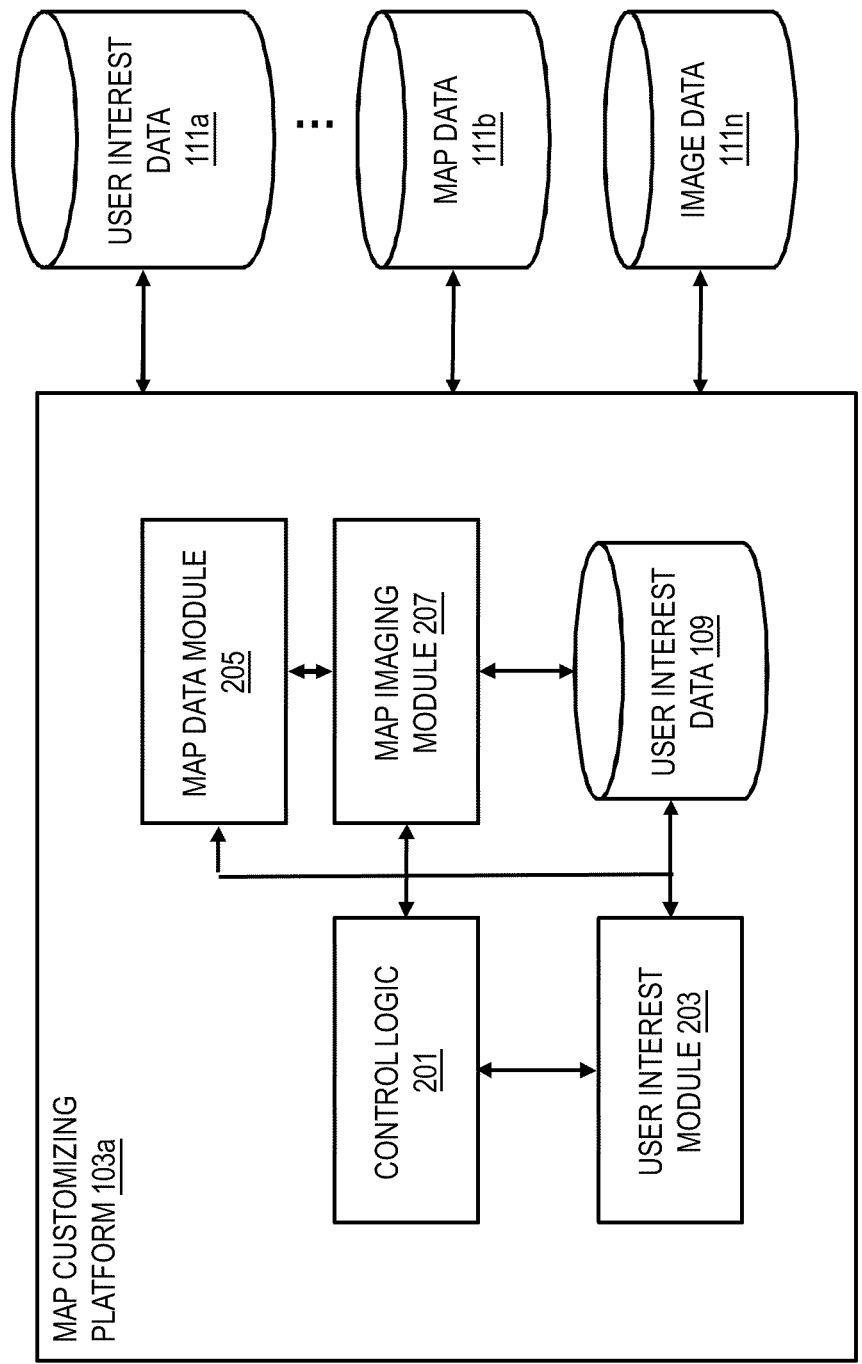
FIG. 2 is a diagram of the components of a map customizing platform, according to one embodiment.

FIG. 2 is a diagram of the components of the map customizing platform 103a, according to one embodiment. By way of example, the map customizing platform 103a includes one or more components for customizing map presentations based on user interests. It is contemplated that the functions of these components may be combined in one or more components or performed by other components of equivalent functionality. In this embodiment, the map customizing platform 103a includes at least a control logic 201 which executes at least one algorithm for executing functions of the map customizing platform 103a, and a user interest module 203 for collecting and/or determining user interests according to various embodiments. For example, the user interest module 203 automatically tracks the number times the user physically visits a particular point of interest or location (e.g., an electronic store) using a built-in GPS receiver, or communicating with a radio frequency identification (RFID) tag via an internal RF component. In addition or alternatively, the user interest module 203 collects data on user interest based on "remote visits" to the point of interest or location, via tracking the number of times a person searches on the Internet for information related to a point of interest or location, or views a web page or web cam related to a point of interest or location. In another embodiment, the user interest module 203 works in conjunction with the control logic 201 to process the media present on a user's device to determine the number photos or videos related to a particular location. The map customizing platform 103a also includes a map data module 205 for retrieving and manipulating map data and a map imaging module 207 for presenting the processed map data based on determined user interests. The map data module 205 can collect map data via an independent map-making component or in conjunction with the GPS receiver. In addition or alternatively, the map data module 205 retrieves map data from the map service platform 103b. The map imaging module 207 can work independently or in conjunction with the imaging service platform 103n to provide visual effects on a point of interest in a map (e.g., a building, a park, a casino, etc.) or on parts of the maps (e.g., biking trails, shopping malls, etc.). The visual effects includes, but not limited to, 2D, 3D, holographs, animation, miniature sets and models, animatronics, Matte paintings, augmented reality, etc. In addition, the platform 103a is connected to the user interest database 109 for storing user interest data which are either retrieved externally or collected via the user interest module 203.

Alternatively, the functions of the map customizing platform 103a can be implemented via an access control application (e.g., a widget) 107 in the user equipment 101 according to another embodiment. Widgets are light-weight applications, and provide a convenient means for presenting information and accessing services. It is contemplated that the functions of these components may be combined in one or more components or performed by other components of equivalent functionality. In this embodiment, the access control application 107 includes modules similar to those of the map customizing platform 103a, as previously described. To avoid data transmission costs as well as save time and battery, its control logic can fetch map and/or user interest data cached or stored in its own database, without requesting data from any servers or external platforms, such as the map customizing platform 103a, the map service platform 103b and the imaging service platform 103n. Usually, if the user equipment is online, data queries are made to online search server backends, and once the device is off-line, searches are made to off-line indexes locally.

Figure 3:
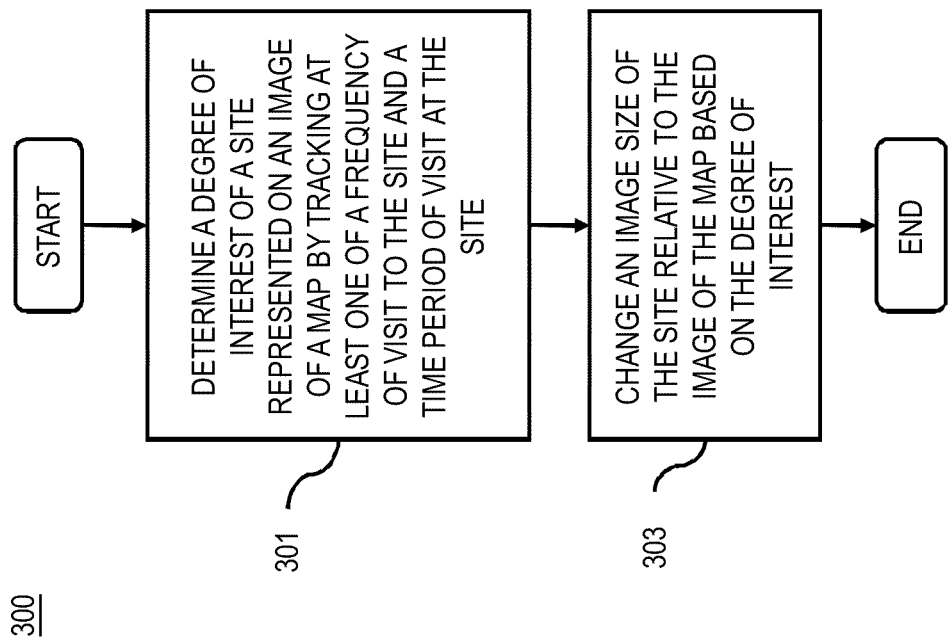
FIG. 3 is a flowchart of a process for customizing map presentations based on user interests, according to one embodiment.
Figure 4:
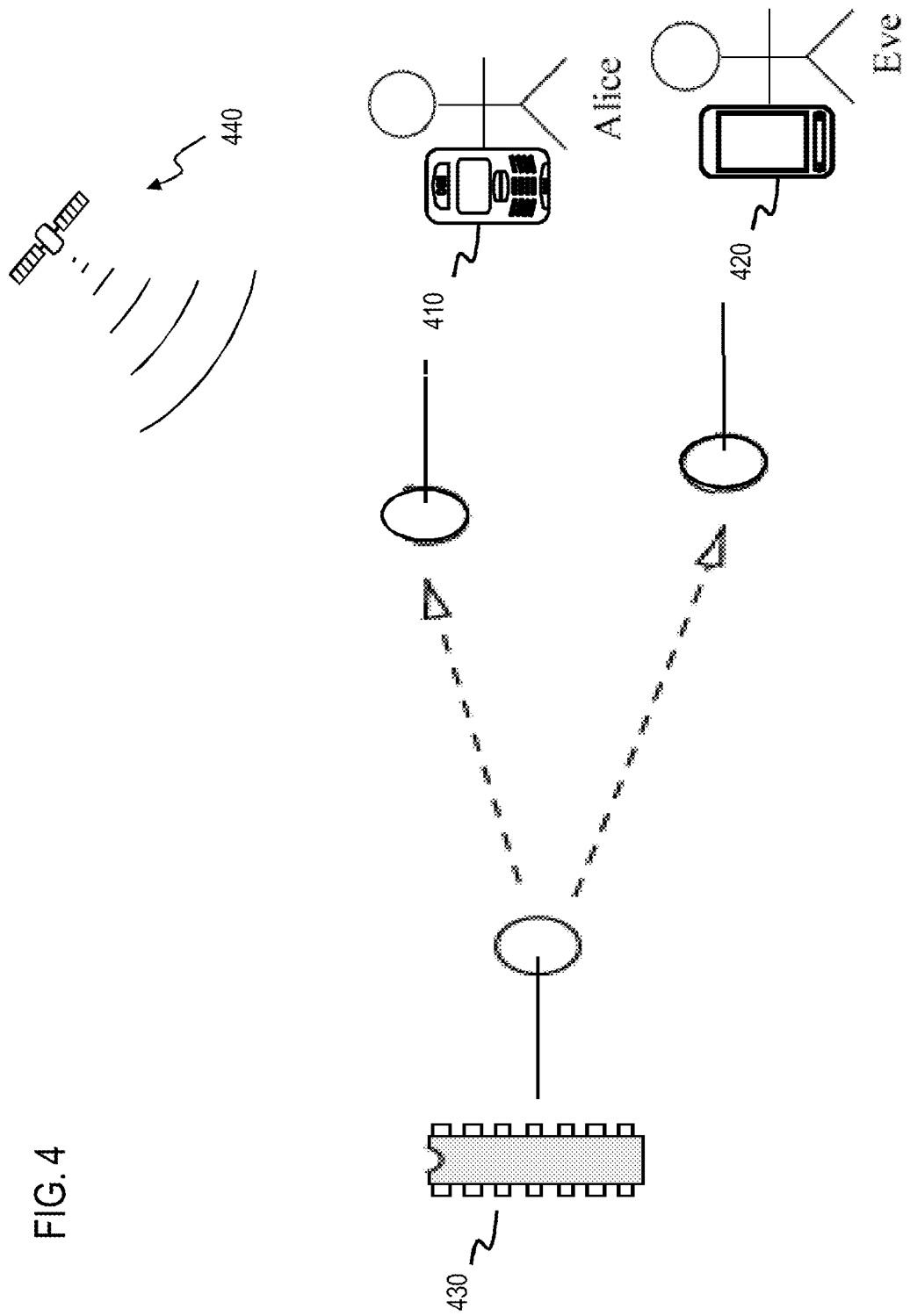
FIG. 4 is a diagram of user interest data collection and transmission components of the system, according to one embodiment.

FIG. 3 is a flowchart of a process 300 for customizing map presentations based on user interests, according to one embodiment. In one embodiment, the map customizing platform 103a performs the process 300 and is implemented in, for instance, a chip set including a processor and a memory as shown FIG. 10. In step 301, the map customizing platform 103a determines a degree of interest of a physical or virtual site represented on an image of a map by tracking at least one of a frequency of visit to the site and a time period of visit at the site. There are different ways to collect various types of user interest data, such as census, marketing survey, user profiling, data mining via user's physical as well as online behaviors, activities, social networks, etc. FIG. 4 is a diagram of user interest data collection and transmission components of the system 100, according to one embodiment.

Taking a user's interest towards a building as an example, the map customizing platform 103*a* determines the user's physical or virtual visit to the building and the length of the visit via the UE 101 and a sensor 430 located at the entrance of the building. In this example, Alice carries a mobile phone 410 while Eve carries a GPS/PDA 420 whenever they passed via the door of the building (including entries and exits). The sensor 430 installed near the building entrance senses a wireless signal sent out from both devices 420, 430, and then sends their Bluetooth® IDs or WLAN ID, or the like to the map customizing platform 103*a*. As such, the map customizing platform 103*a* records the building visiting times and durations by Alice and Eve. Beside the mobile terminals, the map customizing platform 103*a* can use RFID tags attached to the users or their devices and a corresponding RFID reader at building door to collect the information. Instead of human beings, the tracked entities may be animals (pets, endangered species, etc.) whose movements are tracked through RFID, biochips or the like.

In another embodiment, as an alternate approach or if there is no wireless signal reader available at the location of interest, such as a zoo, an Amazon rain forest or the North Pole, the map customizing platform 103*a* uses one or more satellites 440 to track communications signals (e.g. SMS, voice calls, etc.) transmitted from the devices of Alice and Eve to find out their positions and their duration of stay.

In another embodiment, to verify the mobile terminal is actually carried by a trusted user, the map customizing platform 103*a* further communicates with an identification authentication system located on site, such as a system which applies biometric recognition (via fingerprint, face recognition, DNA, hand and palm geometry, iris recognition, odor/scent, etc.).

After determining a degree of user interests to the site, the map customizing platform 103*a* changes an image size of the site relative to the image of the map based on the degree of interests (Step 303). In this case, the map customizing platform 103*a* trades in a certain amount of accuracy in scale for a greater visual usefulness to the user. For example, the size of a building is exaggerated to highlight the user's interests, when it is otherwise undistinguishable on the map at a true scale.

The map customizing platform 103*a* keeps track of how important each element (e.g. building) is for a particular user (or a group of user) in an area presented in a map. The map customizing platform 103*a* changes the size of the elements on the map image (i.e. a cognitive map) on basis of each element's (e.g. the building's) importance for the user. If a building is determined to be unimportant for the user, its size decreases (it may be removed from the user's cognitive map). Conversely, if a building is determined to be important for the user, its size increases. Since the size of a map is fixed, the map customizing platform 103*a* decreases the size of an element or elements to be able to increase the size of an element important for a user. Alternatively, an unimportant element may be moved into the neighborhood for making room to increase the size of an important element in the original area.

FIG. 5A is a flowchart of a process 500 for customizing map presentations of a site based on user interests, according to one embodiment. In one embodiment, the map customizing platform 103*a* performs the process 500 and is implemented in, for instance, a chip set including a processor and a memory as shown FIG. 10. In step 501, the map customizing platform 103*a* tracks a frequency of visit and a time period of visit at a site via a device carried by a person, an animal or an object of interest. The site may be a building, a landmark, a parking lot, an exhibit booth, a point of interest, a geographic object, etc. The device can be a RFID tag, a mobile communications device, a portable computer, a GPS device, etc.

The map customizing platform 103*a* then determines a degree of interest of the site represented on an image of a map by the frequency of visit, the time period of visit and other factors (Step 503), such as the user's remote access to the point of interest (e.g., a building). The data of user's remote access may include (1) browsing by a user via Internet a resource that is related to the point of interest (for example, a restaurant in a certain building and its menu), (2) viewing by the user webcams transmitting video from inside the building or towards the building, (3) mentioning the building by the user in the user's calendar appointments, (4) calling by the user at an establishment in the building, (5) voting by the user the building or an establishment in the building as important (e.g. "Restaurant of the year"), (6) media items (articles, music, video, photos, etc. posted in blogs on web pages, etc.) created by the user regarding the building, (7) articles, music, video, photos, etc. captured by the user regarding the building, etc. By way of example, the map customizing platform 103*a* looks for the name of the building mentioned in text or audio messages created by the user. In this case, the map customizing platform 103*a* determines which building is represented in articles, music, video, photos by looking via a GPS position and heading data in the data files. The map customizing platform 103*a* may conduct content analysis of the communications (e.g., text or audio messages, etc.) by the user to look for expressions of personal importance towards the building, such as "I really love Louvre, I visit it as often as I can", "I take every opportunity to dine at the Eiffel tower," etc. The map customizing platform 103*a* may explore associations between the user and the building by accessing databases storing data on where (the buildings) the user lives in, works in, has a membership to (e.g. a health club, a spa), as well as databases storing data on where (the buildings) the user's friends or contacts live in, work in, have a membership to, etc.

The map customizing platform 103*a* divides the image of the map into cells (Step 505), for example, by superimposing a grid on the map. Individual cells within the grid can represent different geographical areas of the map. In the case of cognitive maps, however, the exact geographical area represented by each cell need not correspond directly by scale to the actual distances between the real geographical areas represented by the cognitive map. In addition, although the present example describes a map divided by a grid to form rectangular cells, it is contemplated that the map customizing platform 103*a* may divide the map into cells of any shape (e.g., triangular, hexagonal, etc.) depending on, for instance, the design of the map. Moreover, different ways of dividing a map into cells can be specified by a user, map provider, network operator, or similar administrator. The process of dividing the map into cells is explained in greater detail with respect to FIGS. 6A-D below.

After dividing the map into cells, the map customizing platform 103*a* then selects a cell which contains at least one site having a frequency of visit that meets or exceeds a predetermined value (step 507). In one embodiment, the map customizing platform 103*a* can, for instance, represent all sites in the selected cell in a three-dimensional manner and all sites in other cells in a two-dimensional manner (Step 509). This differential representation of the selected cell enables the map customizing platform 103*a* to highlight the selected cell for easier identification. It is contemplated that the platform 103*a* may also highlight the selected cell using any other mechanism (e.g., changing the color of the selected cell, enlarging the cell with respected to other cells on the map, etc.). Within the selected cell, the map customizing platform 103*a* can change an image size of the icons representing the sites within the selected site relative to the image size of other sites based on the degree of interest in each site within the cell (Step 511) as determined in Step 503. For example, a site with higher degree of interest is shown using a bigger icon or graphic in the cell than the other sites in the cell. The details of resizing sites are explained in more detail in conjunction with FIGS. 6A-6D below. However, in some cases, enlarging the representation of a site within a selected cell based on the degree of interest may result in exceeding a display size limit of the cell. As a consequence, the platform 103*a* may not be able to display all of the sites with the selected cell because the display area of the cell is too small. To accommodate the display of all sites in the cell, the map customizing platform 103*a* can relocate the icon or graphical representation of one or more sites in the cell to one or more neighboring cells (Step 513). In one embodiment, the platform 103*a* can use the degrees of interest associated with the sites in the selected cell to determine which graphical representation to relocate. For example, the map customizing platform 103*a* may move the representation of a site corresponding to the least demonstrated degree of interest to a neighboring cell while maintaining the display of sites with higher degrees of interest within the selected cells. In addition or alternatively, the graphical representation of a site may be depicted to span across the display areas of two cells (e.g., the selected cell and a neighboring cell). An example of this relocation process is discussed with respect to FIGS. 7-8 below.

In one embodiment, the map customizing platform 103*a* dynamically updates the map display as the information regarding the degrees of interests in the displayed sites change. When the degree of interest of the site (e.g., to the user or group of users) is modified or otherwise changes (Step 515), the map customizing platform 103*a* returns to the processes described in Steps 511 and 513 to update the map display based on the new data. By way of example, the degree of interest in the displayed sites can be modified using the same mechanisms for initially establishing the degree of interest (e.g., frequency of both remote and physical visits to a site). As discussed previously, frequency of physical visits may be obtained using location sensors (e.g., GPS sensors, RFID tags/readers, etc.). Remote visits can be tracked by, for instance, monitoring: (1) a frequency of browsing online information of the site or information related to the site; (2) a time period of browsing online information of the site or information related to the site; (3) information created regarding or related to the site; (3) associations between the site and the user; (4) associations between the site and members of a social network to which the user belongs, etc.

FIG. 5B is a flowchart of a process 520 for customizing map presentations of a route based on user interests, according to one embodiment. In one embodiment, the map customizing platform 103*a* performs the process 520 and is implemented in, for instance, a chip set including a processor and a memory as shown FIG. 10. In this embodiment, a desired or suggested route is shown on the cognitive map when operating in a navigation mode. Using a process similar to that described in FIG. 5A above for determining an interest level associated with a particular point of interest or site, the map customizing platform 103*a* determines a degree of interest in the route by both physical and remote mechanisms. For example, interest can be determined by tracking at least one of a frequency of travelling through the route by the user and a time period of travelling on the route by the user (Step 521). In one embodiment, the route may be travelled by an animal or other mobile object of interest. In this way, the frequency of physical travelling parameter is not limited to travel by just the user. By way of example, remote means for measuring a user's degree of interest are also applicable to measuring interest in the route. These mechanisms include, for instance, monitoring the user's online blogging content regarding the route or online searches about the route or segments of the route. In addition, the devices and equipment for measuring a user's degree of interest in a site (e.g., location sensors, RFID tags, etc.) are also applicable for measuring interest in the route. For example, the mobile terminal carried by the user, a GPS device installed in the user's vehicle, a RFID tag installed at a toll booth on the route, etc. are used to collect the interest data for the route. The map customizing platform 103*a* can use the frequency of travelling along the route to determine the degree of interest in the particular route (Step 523). This degree of interest can in turn determine how the platform 103*a* displays the route on the map or how the platform 103*a* suggests points of interest along the map. For example, a route with a high degree of interest can be displayed or highlighted more prominently on the map than a route with less interest.

Next, the map customizing platform 103*a* divides the displayed image of the map encompassing at least the route into cells (Step 525) according to the same process as described in FIG. 5A above. The map customizing platform 103*a* selects at least one point of interest (e.g., a building) along the route to suggest to the user (Step 527). It is contemplated that any number of points on interest that are along the route can be suggested to the user. For example, the specific number of points of interest can be set by the user or by the map customizing platform 103*a* based on, for instance, the available display area within the cells along the route or the degree of interest associated with the points of interest along the route. The map customizing platform 103*a* then compares a degree of interest of the route with a degree of interest of the point of interest (Step 529), to determine which one should be more visible to the user. In one embodiment, if there are more than one point of interest, the average of their degrees of interest may be used for comparison with the degree of interest in the route.

The map customizing platform 103*a* then changes an image size of the route relative to the image of the point of interest based on the comparison (Step 531), to make the representation best suit the user's interests. If the user is more interested in the route than the point of interest, the platform 103*a* can make the display of the route more visible than the point of interest on the map, and vice versa. To make the route more visible, the map customizing platform 103*a* may, for instance, change the color of the route or add additional visual effects to the route. The relative visibility of the route and the points of interest can be determined based on their respective degrees of interest as explained later in conjunction with FIGS. 6C-6D. The map customizing platform 103*a* then represents the route and the point of interest in the map accordingly (Step 533).

FIGS. 6A-6D are diagrams of maps utilizing the process of FIG. 3, according to one embodiment. By way of example, a map is divided into cells by superposing a grid 601 of cells. The grid 601 (FIG. 6A) has numbers (e.g., 1, 2, 3, 4, 5, 6 . . . ) on the x axis, and letters (e.g., A, B, C, D, E, F . . . ) on the y axis according the embodiment shown in FIG. 6B. The shape of cells is not limited to a rectangle, but can alternately be a triangle, pentagon, hexagon, etc. Each cell may have an identical size, and may contain any number of geographic elements and points of interest presented in a cartographical figure. Each cell has a size ("footprint") expressed as units that represent the capacity of the cell, i.e., how many units (e.g., elements) the cell can contain therein. The size or capacity of a cell is initially defined, e.g., by service operators. For example, if the size of a cell is 6 units, it can show up to 6 one-unit sized elements or 2 three-unit sized elements 603 in a cell B2 as demonstrated in FIG. 6B.

Figure 6A:
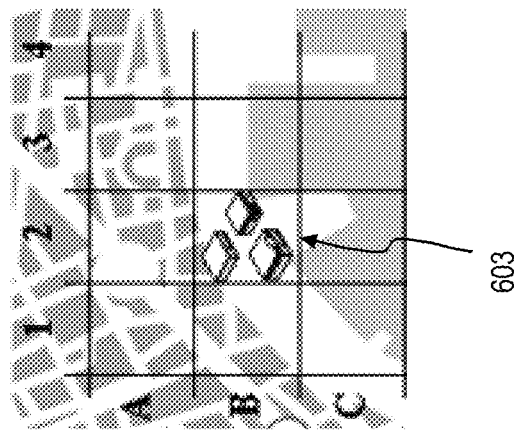
FIGS. 6A-6D are diagrams of maps utilizing the process of FIG. 3, according to one embodiment.
Figure 6B:
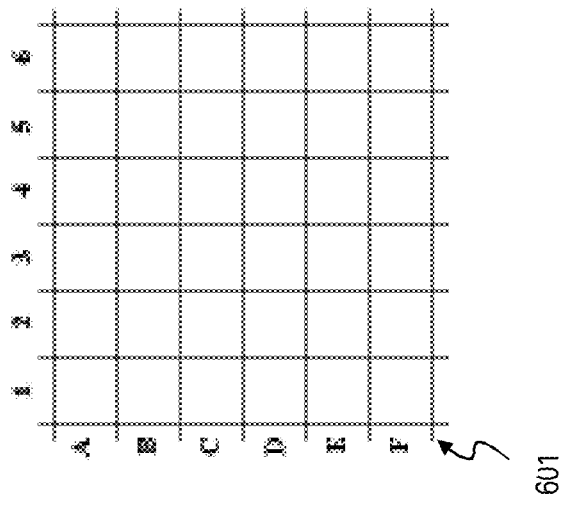

FIG. 6B shows a cell B2 containing 3D object representations of three buildings. Additional visual highlighting effects other than 3D can be added to the building, such as bright colors, holographs, animation, miniature sets and models, animatronics, Matte paintings, augmented reality, etc. The perspective to the objects may be isometric or top-down. Initially, all buildings are mapped one-to-one in the grid of the cognitive map (FIG. 6B).

Figures 6C, 6D:
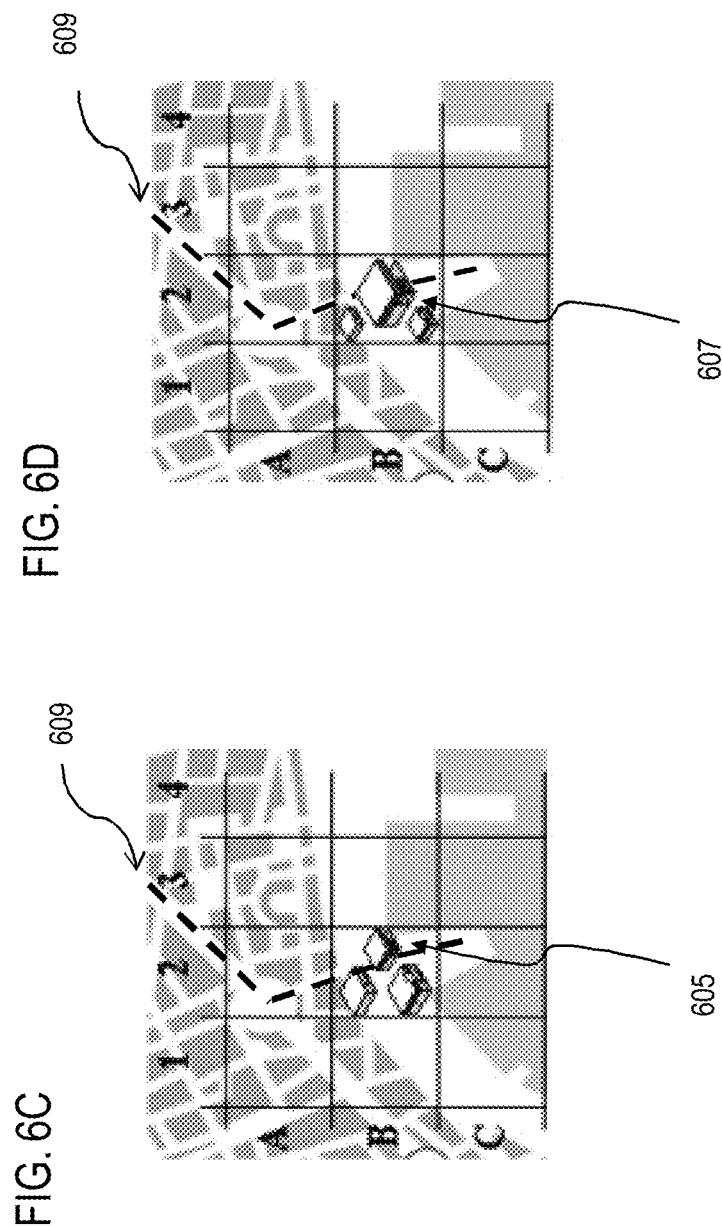

As mentioned, the map customizing platform 103a changes an image size of the selected site relative to the image of the map based on the degree of interest. The map customizing platform 103a keeps track of how important a building is to the user according to, e.g., how often the user visits the building. The detection is done for example through a wireless local area network (WLAN) ID or a Bluetooth ID, an ID defined for other Near Field Communication (NFC) methods as discussed, by referring to the user terminal's communications with a reader at the entrance of the building, and so forth. As the importance of a building decreases for the user, the size of an element 605 representing the building in the cognitive map decreases, e.g., to 1 unit (FIG. 6C). If a building is entirely unimportant for a user, it may be removed from the cognitive map for the user. As the importance of a building increases for the user, the size of the element 607 representing the building in the cognitive map increases, e.g. to 4 units (FIG. 6D). Since it has been defined in one embodiment that each cell can contain 6 units at most, the size of the other two buildings in the cell B2 decreases to 1 unit.

As previously described with respect to FIG. 5B above, the relative visibility of the route and the points of interest can be determined based on their respective degrees of interest. By way of example, a desired/suggested route 609 of a user is displayed as a dotted line in FIG. 6C, when the map is used for navigation (e.g., to navigate to the water front). In one embodiment, the display of the route and associated points of interest may be displayed sequentially in time. More specifically, the route 609 may be first displayed on the map. Then one or more points of interest near or adjacent to the route 609 (e.g., the element 605 in FIG. 6C) are enlarged (e.g., into the element 607 in FIG. 6D) to be more visible. Alternatively, to see the route 609 better or to avoid obscuring the route 609, the points of interest along the route 609 are made smaller regardless of the degrees of user interest they are associated with. In one embodiment, the points of interest can be made to appear but still retain their relative sizes with respect to each other to indicate the associated degrees of interest. In another embodiment, an icon on an user interface for displaying the cognitive map can be turned "on" to make the route 609 more visible, or "off" to make the points of interest along the route more visible.

As mentioned, in some instances, the map customizing platform 103a may not be able to display all sites within one cell because the number of points of interests and/or the sizes of the graphical representations of the points of interests exceed the available display area for a particular cell. This scenario is depicted in the example of FIG. 7. As shown, the building 701 in the cell B2 has become increasingly important for the user so its size in the cognitive map increases to 5 units. Because each cell in the example may contain at most 6 units, the map customizing platform 103a moves one of the smaller unit buildings 703 within the cell B2 to a neighboring cell B1. The map customizing platform 103a chooses the cell B1 since it is vacant and closest to the building 703. Moreover, the cell B1 has the capacity and/or capability to display a graphical representation of the building 703 therein. In contrast, the cell C2 is not available because it is mostly covered by water. In one embodiment, the map customizing platform 103a may also consider additional criteria for selecting the cell, such as zoning, environmental requirements, etc.

The cell B1 was originally empty in the cognitive map, for example because the user has shown little interest in the buildings in that area, or because there are no buildings in that area. Because the cell B1 was vacant, the size of the building 703 on the cognitive map is re-set back to the original 2 units, as illustrated in FIG. 7. The building 703 is moved outside of the cell B2 in order to enhance the visibility of the building of interest 701. In another embodiment, in order to fully show the building of interest 701, some other building or other elements (a river, a park, etc.) can be shown as less visible (e.g. with only dashed or dotted lines/outlines), or simply removed from the cognitive map. This technique is known as de-cluttering, which makes the subject matter of interest easier to see, usually without sacrificing overall accuracy. The map customizing platform 103a allows the user to activate de-cluttering between the modes of ON, OFF and AUTO as needed. In the AUTO mode, the map customizing platform 103a adjusts the degree of de-cluttering as the user changes the display scale. In FIG. 7, the map background remains unchanged when the building 703 is moved. In another embodiment, the map background is transformed when a building is moved. For example, the area in the map that is below the moved building 703 is moved along with the building 703 to the new cell B1.

It would be optimal to move an element to a neighboring cell that is closets to the original cell, i.e., a cell that share a border with the original cell (as in the example of FIG. 7), to keep the moved building as close to its original location as possible. However, when doing so is not possible, the map customizing platform 103a takes a different approach such as the one demonstrated via FIG. 8.

By way of example, an element 'o' in a cell C3 in FIG. 8A increases in importance for a user, while another element 'x' is located in the same cell. In order to make room in the cell C3 for increasing the size of 'o', the map customizing platform 103a first determines where to move element 'x' into. All immediately surrounding cells B2, B3, B4, C2, C4, D2, D3 and D4 are already completely occupied. Only a cell C5, which is two cells away, is vacant. Thus, a cell C4 is a suitable new location for element 'x' after moving elements therein to the cell C5, as illustrated in FIG. 8B.

The map customizing platform 103a then determines which of the existing elements ('w' and 'z') in the cell C4 is less important for the user (e.g., as measured by degree of interest). In this case, the element 'z' is of minor interest, so the map customizing platform 103a moves the element 'z' to the cell C5 and then the element 'x' to the cell C4. Thereafter, the map customizing platform 103a increases the size of element 'o' in the cell C3 to 4 units, as illustrated in FIG. 8B.

By using this approach, the map customizing platform 103a moves unimportant elements away by one cell at a time (and repeats the approach in a manner of a "chain reaction" until some element(s) can be moved to an empty cell), in order to make space for an enlarged element in its own cell. In addition, the map customizing platform 103a also considers whether the properties of the cell (e.g. is there water, a park, a parking lot, or does the topography differ greatly such as a hill) to permit an element (e.g., a building) to be moved there.

The cognitive map can be provided for a single user or for a certain group of users. To allow a single user to compare the user's cognitive map with another user's or a group's cognitive map, the map customizing platform 103a further includes a new interface module for making such comparisons. Alternatively, the map customizing platform 103a have the control logic 201 support the function of comparing cognitive maps.

The above-described embodiments can be used with numerous cartographic principles and designs to display quantitative and qualitative information, such as urban maps for navigational or real estate use (wherein elements include buildings, parking lots, etc.), nature park maps (where elements include fountains, caves, feeding ground, etc.), resource maps (where elements include corn fields, wheat fields, oil fields, gas fields, etc.), exhibition area maps (where elements include exhibit booths, etc.), amusement park maps (where elements include theme rides, restaurants, restrooms, information desks, etc.), etc. In addition to maps of real-world locations, the system 100 creates cognitive maps of virtual worlds (such as World of Warcraft®, Second Life®, etc.). In addition, routes can be drawn between the elements in the cognitive map (such as the London Underground map, etc.).

The customized maps can contain as many points of interest (POIs) as long as they are visible on a display. The customized map makes it easier for the user to locate in the map from favorite restaurants to frequently visited gas stations, etc. Beside the UE 101, the customized map may be available online or onboard in most navigation-enabled vehicles.

The customized map may be adapted for express delivery services, emergency and government routing plans, efficient field service management, numerous fleet operations, mobile commerce, and any location based services (LBS). This degree of map presentation customization has unlimited adoption based upon types and sources of user interest data. The described embodiments provide maps highlighting points of interest which are relevant to particular individuals. Through state-of-the-art 3D models of buildings or the like (from addresses and road signs to turn restrictions turn restrictions, physical barriers and gates, one-way streets, restricted access and relative road heights, real-time traffic, etc.), a user may access the user's own cognitive map or the cognitive map of some other users to obtain useful and relevant information in an intuitive manner. For example, a tourist may want to see the cognitive park map of a park ranger to better enjoy the park.

The processes described herein for providing customized map presentation may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
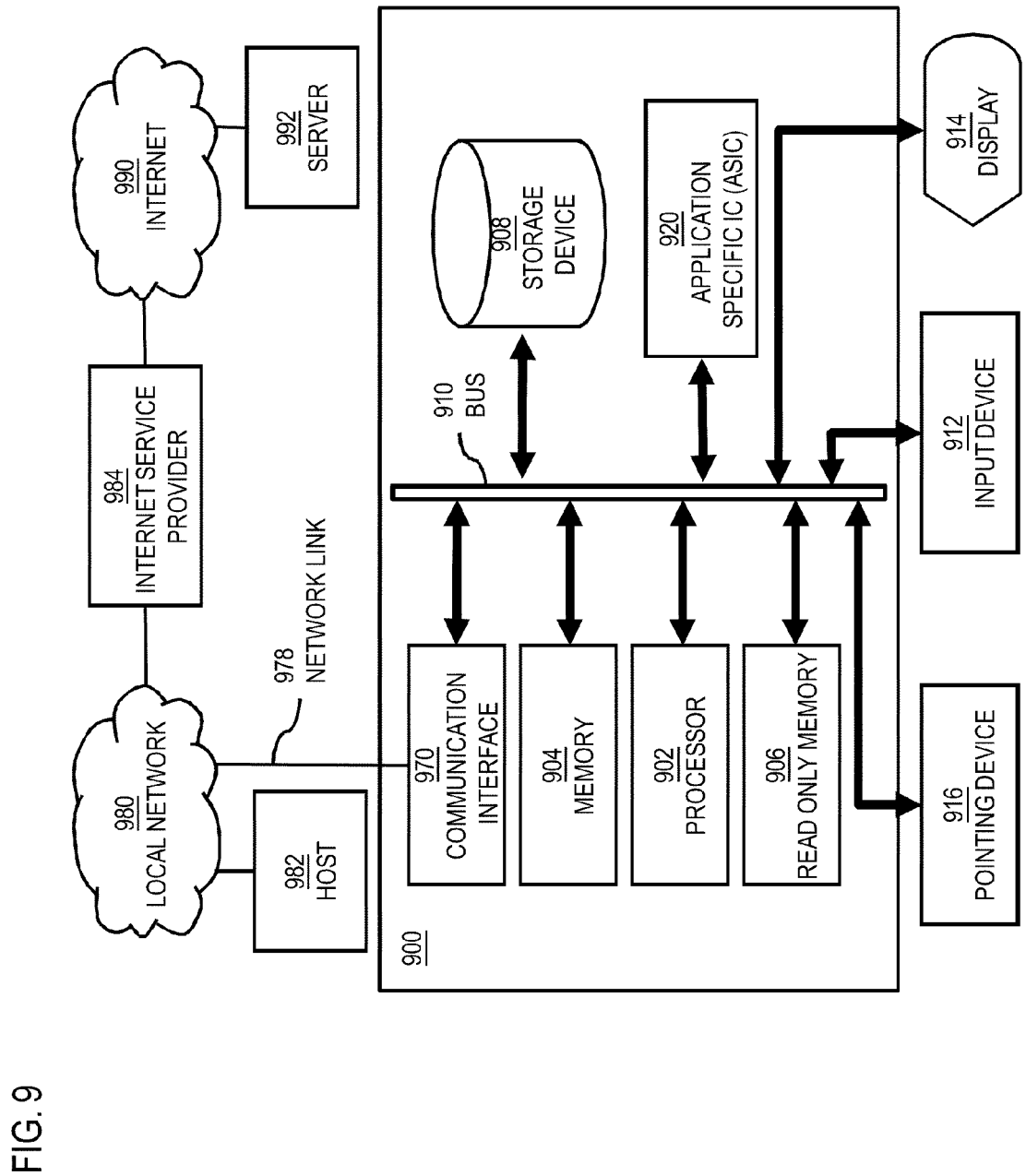
FIG. 9 is a diagram of hardware that can be used to implement an embodiment of the invention.

FIG. 9 illustrates a computer system 900 upon which an embodiment of the invention may be implemented. Computer system 900 is programmed (e.g., via computer program code or instructions) to customize map presentations based on user interests as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of customizing map presentations based on user interests.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to customize map presentations based on user interests. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for customizing map presentations based on user interests. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volacell storage that loses the information stored thereon when power is lost. Also coupled to bus 910 is a non-volacell (persistent) storage device 908, such as a magnetic disk, optical disk or flash card, for storing information, including instructions, that persists even when the computer system 900 is turned off or otherwise loses power.

Information, including instructions for customizing map presentations based on user interests, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection from the UE 101 to the communication network 105 for customizing map presentations based on user interests.

The term computer-readable medium is used herein to refer to any medium that participates in providing information to processor 902, including instructions for execution. Such a medium may take many forms, including, but not limited to, non-volacell media, volacell media and transmission media. Non-volacell media include, for example, optical or magnetic disks, such as storage device 908. Volacell media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990. A computer called a server host 992 connected to the Internet hosts a process that provides a service in response to information received over the Internet. For example, server host 992 hosts a process that provides information representing video data for presentation at display 914.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volacell storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
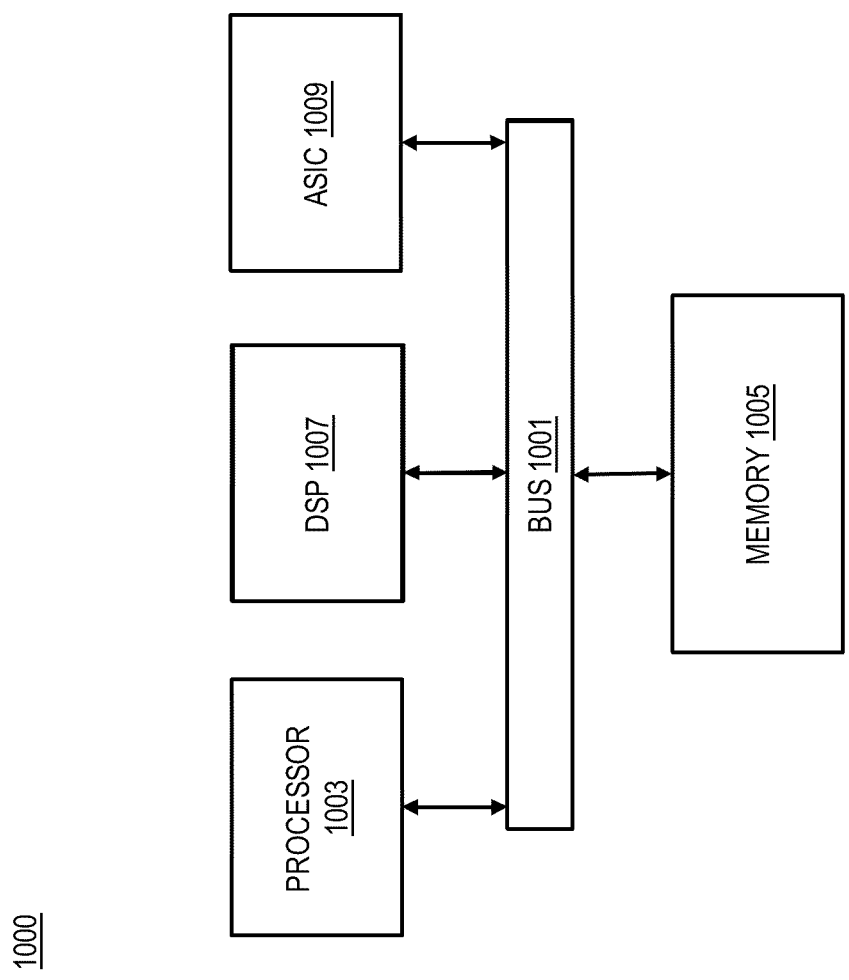
FIG. 10 is a diagram of a chip set that can be used to implement an embodiment of the invention.

FIG. 10 illustrates a chip set 1000 upon which an embodiment of the invention may be implemented. Chip set 1000 is programmed to customize map presentations based on user interests as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of customizing map presentations based on user interests.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to customize map presentations based on user interests. The memory 1005 also stores the data associated with or generated by the execution of the inventive steps.

Figure 11:
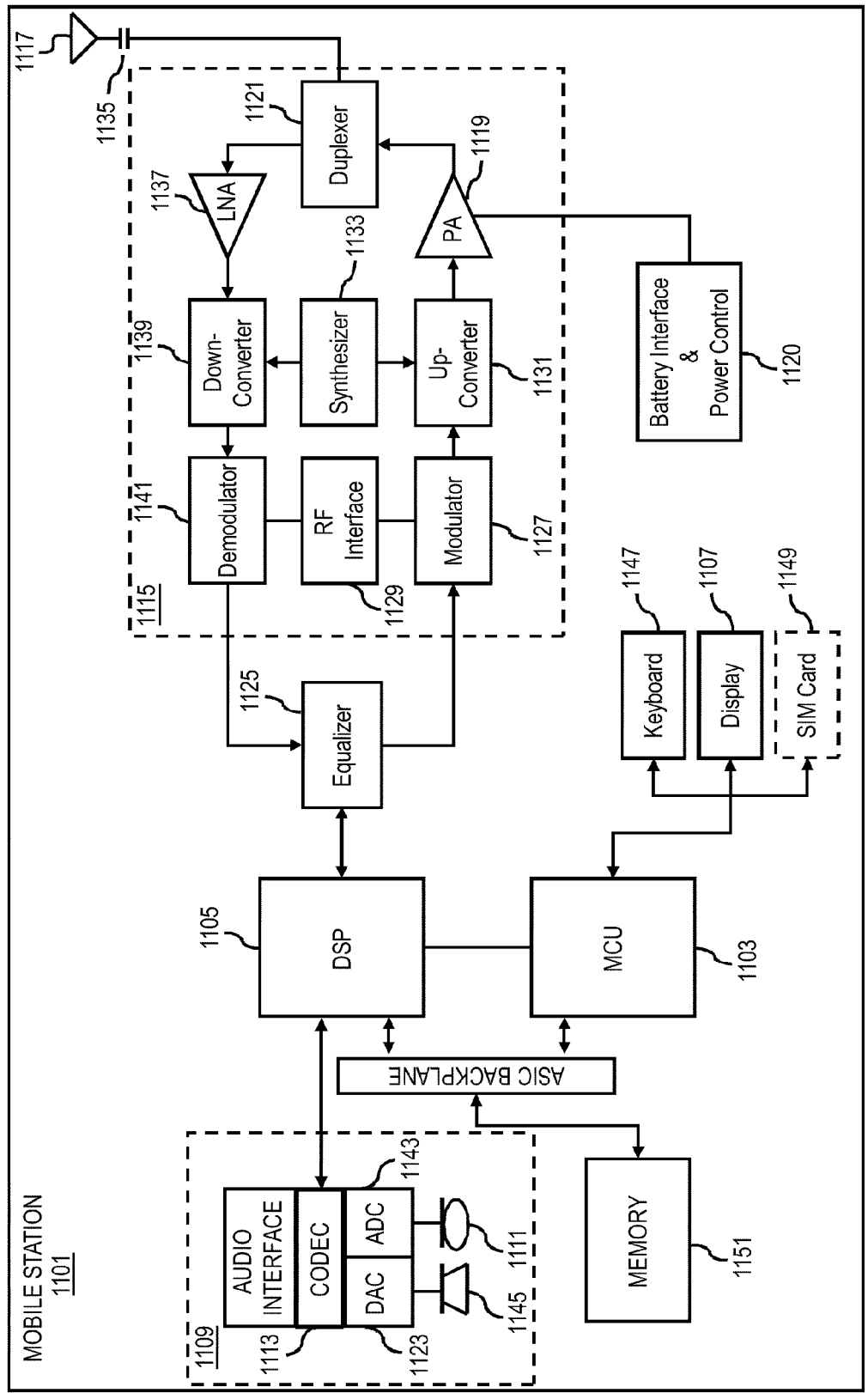
FIG. 11 is a diagram of a mobile terminal (e.g., a handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1100, or a portion thereof, constitutes a means for performing one or more steps of customizing map presentations based on user interests. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of customizing map presentations based on user interests. The display unit 1107 includes display circuitry configured to display at least a portion of a user interface of the mobile terminal (e.g., mobile telephone). Additionally, the display unit 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1143. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1123 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to customize map presentations based on user interests. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1143 and DAC 1123. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volacell storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   dividing an image of a map into cells;
   determining a degree of interest of a site represented in a cell on the image of the map by tracking at least one of a frequency of visit to the site and a time period of visit at the site;
   changing an image size of the site in the cell relative to the image of the map based on the degree of interest;
   determining a degree of interest of a route by tracking at least one of a frequency of travelling through the route and a time period of travelling on the route;
   representing the route in the image of the map;
   comparing the degree of interest of the route with the degree of interest of the site; and
   changing a visibility of the route with respect to the image size of the site based on the comparison.

2. The method of claim 1, further comprising:
   tracking the frequency of visit and the time period of visit at the site via a device carried by a person, an animal or an object of interest,
   wherein the device is a RFID tag, a mobile communications device, a portable computer, or a GPS device.

3. The method of claim 1, further comprising:
   selecting a cell which contains at least one site having a frequency of visit that meets or exceeds a predetermined value; and
   enlarging the image size of the selected site,
   wherein the cells each have an identical size.

4. The method of claim 1, further comprising:
modifying the degree of interest of the site to a person based on at least one of:
a frequency of browsing online by the person information of the site or information related to the site,
a time period of browsing online by the person the information of the site or the information related to the site,
information created by the person regarding or related to the site,
association between the site and the person,
association between the site and members of a social network which the person belongs to; and
changing the image size of the site relative to the image of the map based on the modified degree of interest.

5. The method of claim 1, wherein the site includes a building, a landmark, a parking lot, an exhibit booth, a point of interest, or a geographic object.

6. A method comprising:
dividing an image of a map into cells;
determining a degree of interest of a site represented in a cell on the image of the map by tracking at least one of a frequency of visit to the site and a time period of visit at the site;
changing an image size of the site in the cell relative to the image of the map based on the degree of interest;
selecting a cell which contains at least one site having a frequency of visit that meets or exceeds a predetermined value;
enlarging the image size of the selected site,
wherein the cells each have an identical size; and
when enlarging the selected site as to exceed a size limit of the cell to accommodate all sites in the cell, relocating another site of less interest in the cell to a neighboring cell to accommodate the selected site.

7. An apparatus comprising:
at least one processor; and
at least one memory including computer program code,
wherein the at least one memory and the computer program code configured to, with the at least one processor, cause the apparatus to perform at least the following:
divide an image of a map into cells;
determine a degree of interest of a site represented in a cell on the image of the map by tracking at least one of a frequency of visit to the site and a time period of visit at the site;
change an image size of the site in the cell relative to the image of the map based on the degree of interest;
determine a degree of interest of a route by tracking at least one of a frequency of travelling through the route and a time period of travelling on the route;
represent the route in the image of the map;
compare the degree of interest of the route with the degree of interest of the site; and
change a visibility of the route with respect to the image size of the site based on the comparison.

8. An apparatus of claim 7, wherein the apparatus is further caused to:
track the frequency of visit and the time period of visit at the site via a device carried by a person, an animal or an object of interest,
wherein the device is a RFID tag, a mobile communications device, a portable computer, or a GPS device.

9. An apparatus of claim 7, wherein the apparatus is further caused to:
select a cell which contains at least one site having a frequency of visit that meets or exceeds a predetermined value; and
enlarge the image size of the selected site,
wherein the cells each have an identical size.

10. An apparatus of claim 7, wherein the apparatus is further caused to:
modify the degree of interest of the site to a person based on at least one of:
a frequency of browsing online by the person information of the site or information related to the site,
a time period of browsing online by the person the information of the site or the information related to the site,
information created by the person regarding or related to the site,
association between the site and the person,
association between the site and members of a social network which the person belongs to; and
change the image size of the site relative to the image of the map based on the modified degree of interest.

11. An apparatus of claim 7, wherein the site includes a building, a landmark, a parking lot, an exhibit booth, a point of interest, or a geographic object.

12. An apparatus comprising:
at least one processor; and
at least one memory including computer program code,
wherein the at least one memory and the computer program code configured to, with the at least one processor, cause the apparatus to perform at least the following:
divide an image of a map into cells;
determine a degree of interest of a site represented in a cell on the image of the map by tracking at least one of a frequency of visit to the site and a time period of visit at the site;
change an image size of the site in the cell relative to the image of the map based on the degree of interest;
select a cell which contains at least one site having a frequency of visit that meets or exceeds a predetermined value;
enlarge the image size of the selected site,
wherein the cells each have an identical size; and
when enlarging the selected site as to exceed a size limit of the cell to accommodate all sites in the cell, relocate another site of less interest in the cell to a neighboring cell to accommodate the selected site.

13. A computer-readable storage medium carrying one or more sequences of one or more instructions which, when executed by one or more processors, cause an apparatus to perform at least the following:
dividing an image of a map into cells;
determining a degree of interest of a site represented in a cell on the image of the map by tracking at least one of a frequency of visit to the site and a time period of visit at the site;
changing an image size of the site in the cell relative to the image of the map based on the degree of interest;
determining a degree of interest of a route by tracking at least one of a frequency of travelling through the route and a time period of travelling on the route;
representing the route in the image of the map;
comparing the degree of interest of the route with the degree of interest of the site; and
changing a visibility of the route with respect to the image size of the site based on the comparison.

14. A computer-readable storage medium of claim 13, wherein the apparatus is caused to further perform:
tracking the frequency of visit and the time period of visit at the site via a device carried by a person, an animal or an object of interest, wherein the device is a RFID tag, a mobile communications device, a portable computer, or a GPS device.

15. A computer-readable storage medium of claim 13, wherein the apparatus is caused to further perform:
selecting a cell which contains at least one site having a frequency of visit that meets or exceeds a predetermined value; and
enlarging the image size of the selected site,
wherein the cells each have an identical size.

16. A computer-readable storage medium of claim 13, wherein the apparatus is caused to further perform:
modifying the degree of interest of the site to a person based on at least one of:
a frequency of browsing online by the person information of the site or information related to the site,
a time period of browsing online by the person the information of the site or the information related to the site,
information created by the person regarding or related to the site,
association between the site and the person,
association between the site and members of a social network which the person belongs to; and
changing the image size of the site relative to the image of the map based on the modified degree of interest.

17. A computer-readable storage medium carrying one or more sequences of one or more instructions which, when executed by one or more processors, cause an apparatus to perform at least the following:
dividing an image of a map into cells;
determining a degree of interest of a site represented in a cell on the image of the map by tracking at least one of a frequency of visit to the site and a time period of visit at the site;
changing an image size of the site in the cell relative to the image of the map based on the degree of interest;
selecting a cell which contains at least one site having a frequency of visit that meets or exceeds a predetermined value;
enlarging the image size of the selected site,
wherein the cells each have an identical size; and
when enlarging the selected site as to exceed a size limit of the cell to accommodate all sites in the cell, relocating another site of less interest in the cell to a neighboring cell to accommodate the selected site.

* * * * *